United States Patent
Balestrieri et al.

(10) Patent No.: US 6,770,711 B2
(45) Date of Patent: Aug. 3, 2004

(54) PROCESS FOR CROSS-LINKING AN ACRYLIC POLYMER OR COPOLYMER OR AN ACRYLIC DERIVATIVES OF A COPOLYMER AND THE CROSS-LINKED POLYMER THEREBY OBTAINED

(75) Inventors: Gerardo Balestrieri, Milan (IT); Carmelo Protopapa, Bologna (IT)

(73) Assignee: Polymekon S.r.l., Milan (IT)

( * ) Notice: Subject to any disclaimer, the term of this patent is extended or adjusted under 35 U.S.C. 154(b) by 0 days.

(21) Appl. No.: 10/275,252

(22) PCT Filed: Dec. 24, 2001

(86) PCT No.: PCT/IB01/02721
§ 371 (c)(1),
(2), (4) Date: Nov. 7, 2002

(87) PCT Pub. No.: WO02/051888
PCT Pub. Date: Jul. 4, 2002

(65) Prior Publication Data
US 2003/0171509 A1 Sep. 11, 2003

(30) Foreign Application Priority Data
Dec. 27, 2000 (IT) .......................................... BO00A0745

(51) Int. Cl.⁷ ............................................... C08L 31/00

(52) U.S. Cl. ....................... 524/832; 524/599; 524/602; 524/827; 524/833

(58) Field of Search ................................ 524/602, 607, 524/608, 833, 832, 599, 827

(56) References Cited

U.S. PATENT DOCUMENTS 4,461,276 A  *  7/1984  Yogev et al. ................ 126/415
5,280,078 A       1/1994  Gregor et al.

FOREIGN PATENT DOCUMENTS

EP        0 808 853       11/1997
GB        1 434585    *   5/1976

* cited by examiner

Primary Examiner—Helen Lee Pezzuto
(74) Attorney, Agent, or Firm—Oblon, Spivak, McClelland, Maier & Neustadt, P.C.

(57) ABSTRACT

A cross-linked acrylic polymer that is highly biocompatible is prepared from a water-soluble acrylic monomer by preparing an aqueous polymerization solution containing an acrylamide monomer and a catalyzing agent; polymerizing the monomer present in the polymerization solution by agitating and heating the polymerization solution. The polymerization is conducted in the presence of gaseous oxygen.

20 Claims, No Drawings

PROCESS FOR CROSS-LINKING AN ACRYLIC POLYMER OR COPOLYMER OR AN ACRYLIC DERIVATIVES OF A COPOLYMER AND THE CROSS-LINKED POLYMER THEREBY OBTAINED

TECHNICAL FIELD

The present invention relates to a process for cross-linking an acrylic polymer or copolymer or an acrylic derivative of a copolymer and the cross-linked acrylic polymer thereby obtained.

BACKGROUND ART

The use of mini-invasive techniques is well-known in modern cosmetic and reconstructive plastic surgery. Many of these techniques involve the use of a fillers.

The fillers known today have many advantages but also present major application limits. For example, natural products (such as collagen and hyaluronic acid) are rapidly reabsorbed. Methacrylates are reabsorbed more slowly but do not possess an adequate degree of biocompatibility. Common polyacrylamide is highly biocompatible but does not possess sufficient chemical and physical stability and thus is not suitable for use in large quantities to fill large spaces.

The need therefore remains for a material that possesses all the properties expected of a good filler. Numerous methods of polymer cross-linking are known. These differ according to the type of polymer to be cross-linked and the type of cross-linking required.

The cross-linking of a polymer can be accomplished by chemically bonding monomers, polymer fragments or parts of polymer chains to the molecular chains of the polymer. For the cross-linking reaction of a polymer, several types of catalysts or catalytic systems are used. The nature of the catalyst depends on the type of cross-linking reaction to be achieved in the molecular chains of the polymer.

The catalysts may be chosen from compounds having peroxide groups, silane products or nitrate compounds. Alternatively, polymerization (and cross linking) can in some cases be initiated by electron beams.

Well-known examples of cross-linking reactions are the reactions of sulphur with rubber and a large number of elastomers (vulcanization) and the reaction of glycol, maleic acid and styrene to obtain reinforced polyesters.

In the field of cross-linked acrylic polymers obtained by a polymerizing reaction between acrylic monomers or derivatives thereof, the need is felt for a process in which the cross-linking of the polymer occurs in the reaction medium during the monomer polymerizing stage.

In particular, there remains a need for a cross-linking system capable of reacting during the monomer polymerizing stage.

The present invention has for one of its objects to provide a process for preparing a cross-linked acrylic polymer, in the form of a hydrogel, from water-soluble acrylamide monomers and catalysts whose cross-linking is subject to reaction during and after the polymerization stage.

Another object of the invention is to provide a water-insoluble, cross-linked acrylic polymer made using the process according to the invention.

These and other objects, which will become apparent in the detailed description that follows have been attained by the Applicant using a process in which the cross-linking of a polymer or of a copolymer is accomplished by reacting the water-soluble amide monomers in the presence of molecular oxygen during the polymerization stage.

DISCLOSURE OF THE INVENTION

The first object of the invention is accomplished by providing a process for preparing a cross-linked acrylic polymer, as described in the independent claim below.

The second object of the invention is accomplished by providing a cross-linked acrylic polymer, as described in the independent claim below.

Other preferred embodiments of the invention are described in the dependent claims.

Further technical characteristics of the invention appear in the detailed description below, from which the advantages of the invention will become evident.

The process for preparing a cross-linked acrylic polymer according to this invention comprises a first step of preparing an aqueous polymerizing solution comprising the acrylamide monomer, catalyzing agents and, possibly, also a chelating agent such as for example ethylene-bis(oxyethylene nitrilo)-tetracetic acid.

In addition to acrylamide, the polymerizing solution preferably includes other monomers, chosen from N,N'-methylene-bis-acrylamide and N,N'-ethylene-bis-acrylamide. In this case, the polymerizing process according to the present invention provides an acrylic copolymer or an acrylic derivative of a copolymer.

Preferably the aqueous polymerizing solution comprises the acrylamide monomer, a derivative of it such as methylolacrylamide, one or more monomers chosen from N,N'-methylene-bis-acrylamide and N,N'-ethylene-bis-acrylamide, catalyzing agents and, possibly, a chelating agent such as ethylene-bis(oxyethylene nitrilo)-tetracetic acid.

The polymer, prepared from amide monomers, takes the form of a hydrogel with imide-amide cross links which can be schematically represented as follows:

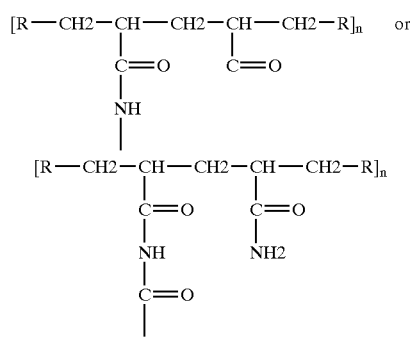

Under certain conditions, ammonia may be released.

The quantities are expressed in terms of weight and are preferably in the range from 2 to 7% of acrylamide, preferably 3 to 5%, from 0.2 to 4% of N,N'-methylene-bis-acrylamide, and from 0.1 to 4% of N,N'-ethylene-bis-acrylamide.

Preferably the catalyst is ammonium persulphate or hydrogen peroxide or any other catalyst normally used in redox polymerizing reactions.

The polymerizing solution is an aqueous solution made with distilled water, preferably twice-distilled apyrogenic water.

The process according to the invention involves a subsequent step of polymerizing the monomers present in the polymerizing solution.

Polymerization is achieved by agitating and heating the polymerizing solution to a temperature of between 30 and 80° C.

The polymerizing reaction lasts from 1 to 48 hours, preferably 1 to 24 hours and, better still, 4 to 16 hours.

The polymerizing step must be performed with gaseous oxygen. The presence of gaseous oxygen during the polymerization reaction makes it possible to achieve cross-linking of the acrylic polymer as described below. The presence of gaseous oxygen during the reaction modulates polymerization (including cross-linking and co-polymerization) to obtain a hydrogel with a different molecular weight.

Preferably, the polymerizing solution is saturated with gaseous oxygen.

Preferably, the oxygen is bubbled through the polymerizing solution for a length of time varying from 1 to 24 hours at a temperature of between 30 and 80° C.

The polymerization process can be performed using metal salts containing metal cations, such as aluminium, zirconium and titanium, having the valencies suitable for further chelating certain intramolecular structures.

Advantageously, the polymerization step is followed by a step of washing the polymer in aqueous medium at a temperature of 80 to 100° C. for a length of time ranging from 1 to 5 hours, preferably from 3 to 4 hours.

Advantageously, after the washing step, the polymer is maintained at a temperature of between 110 and 130° C. for a length of time varying from 0.5 to 6 hours.

Alternatively, the aqueous polymerizing solution comprises the acrylamide monomer and one or more other monomers selected from N,N'-methylene-bis-acrylamide and N, N'-ethylene-bis-acrylamide.

The reactions involved in the process described above and which lead to the formation of the cross-links in the acrylic polymer may be schematically represented as follows:

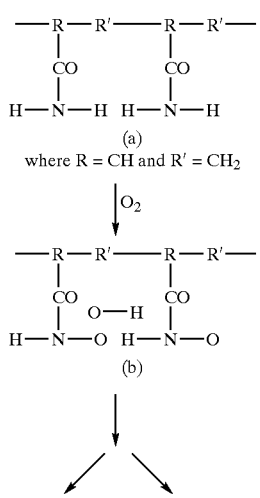

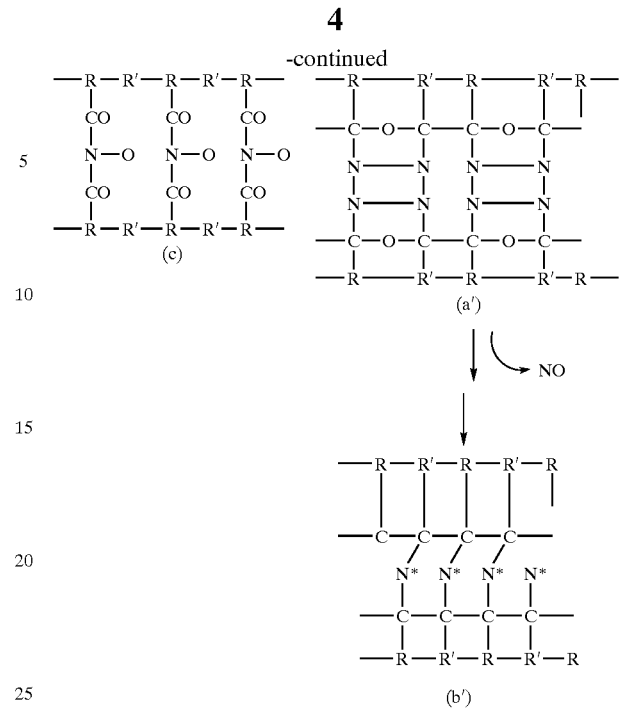

The polymerizing reaction may follow one of two courses, depending on operating conditions.

Initially, the polymer (a) under formation in the presence of $O_2$ forms the compound (b). At this point, the compound (b) can form the polymer compound (c) which constitutes one possible end product of this polymerization process.

Alternatively, the compound (b) may form the compound (a') by elimination of NO. After forming the compound (a'), the reaction ends with the formation of the polymer compound (b'). The "*" symbol indicates the nitrogen atoms involved in the reaction to eliminate NO.

The reaction involved in polymerization is the substitution of N—O with N—C links. The (OH) is provided by the oxidation of H—N—O. According to Hoffman, the (OH) as basic catalyst attacks an $NH_2$ group. The same reaction occurs in the analogous chain and cross-link is produced.

The reaction medium may be weakly acidic or weakly alkaline. In the former case, the polymer compound (b') is produced, the latter case, the polymer compound (b).

As the reaction proceeds, the ketone groups may also be attacked, transforming some of the CO into COOH.

The present invention also has for an object a cross-linked acrylic polymer that can be prepared using the process described above.

Another object of the present invention is to apply to the field of medicine the cross-linked and/or, by the use of metal salts, cross-linked chelated acrylic polymer as a material for plastic surgery.

Advantageously, the cross-linked polymer according to the present invention is used in surgery in endoprostheses for soft tissue. This application is designed to increase the volume of the soft tissue and to fill in gaps of varying sizes in such tissue.

The cross-linked and/or (by the use of metal salts) cross-linked chelated acrylic polymer prepared using the process according to the present invention has the following chemical and physical properties:

pH between 6.5 and 7.5, preferably 7;
ppm<0.2;

radiotransparent;

colourless;

oxidizing value<1;

dry residue between 3 and 4, preferably 3.5;

no free heavy metal ions within the molecule;

imide type links visible at spectrophotometer; and insoluble in water.

Advantageously, the cross-linked and/or, by the use of metal salts, cross-linked chelated acrylic polymer according to the present invention takes the form of a hydrogel.

The cross-linked polymer according to the present invention has been tested at several research centres. The tests have shown not only the high degree of bio-compatibility of the material but also its total incapacity to stimulate cell growth.

The chemical and physical properties of the cross-linked polymer according to the present invention are such that it can maintain its structural stability even in time. Once implanted, a permanent capsule is formed which isolates the compound from the surrounding tissue. Thanks to these properties, the cross-linked polymer according to the present invention undoubtedly constitutes a novelty. It can be injected into a patient's body (to form a prosthesis endogenously) in much larger quantities than the average quantities normally used up to now. As much as several hundred grams of it can be implanted without risk to the patient's health.

This biological safety has been demonstrated not only by biological studies but also by a multicentric clinical study conducted at several Italian universities.

The invention will now be further described with reference to the following application examples without restricting the scope of the inventive concept.

EXAMPLE 1

A polymerizing solution, prepared with the following components, is placed in a reactor and agitated continuously:

24.5 g acrylamide, 0.025 g ethylene-bis(oxyethylene nitrilo)-tetracetic acid, 1.63 g of N,N'-methylene-bis-acrylamide, and 2.5 g ammonium persulphate in 1000 ml of twice-distilled water with a pH of 5.6.

The polymerizing solution is heated to 80° C. To obtain the polymer, oxygen is bubbled through the solution and the solution agitated, keeping the reaction medium at a temperature of 80° C. for two hours.

The product is then washed in hot water at 90° C. for four hours.

Next, the product is held at a temperature of 125° C. for five hours.

The end product is the cross-linked polymer according to the present invention.

EXAMPLE 2

The following components are reacted in 1000 ml of twice-distilled water:

27.4 g acrylamide, 0.50 g of N,N'-ethylene-bis-acrylamide, 2.5 g ammonium persulphate, and 0.1 g of $AgNO_3$.

The acrylamide is reacted with N,N'-ethylene-bis-acrylamide in the presence of ammonium persulphate. After mixing for 30 minutes, $O_2$ is bubbled through and reacted with the silver nitrate. The solution is left to stand for 30 minutes at 37° C. The end product has a pH of 4.8 and a dry residue of 7.2%.

EXAMPLE 3

The following components are reacted in 500 ml of apyrogenic water:

48 g methylolacrylamide, 0.60 g of N,N'-methylene-bis-acrylamide, 0.45 g of N,N'-ethylene-bis-acrylamide, and 4 g ammonium persulphate.

The methylolacrylamide is reacted with the cross-linking agents in the presence of ammonium persulphate for approximately 15 minutes at 37° C. The oxygen is then bubbled through for 20 minutes and the solution left to stand in a warmer at 60° C. for 12 hours. The resulting product is pH 7 (and ppm<4). The product is then washed at 90° C. for 30 minutes to remove the residual monomers.

EXAMPLE 4

The following components are reacted in 500 ml of apyrogenic water:

400 ml of twice-distilled water at pH 5.7, 20 g of acrylamide, 2 ml of hydrogen peroxide 30%, and 0.04 g ammonium persulphate.

The above solution is placed in a reactor and agitated continuously with oxygen bubbled through it for 16 hours at 55° C. The resulting polymer is washed as in the previous example. The polymer is then treated at 125° C. for 3 hours.

EXAMPLE 5

20 g of acrylamide, 2 ml of hydrogen peroxide 30% and 0.04 g of ammonium persulphate are reacted in 400 ml of twice-distilled water with pH 5.7.

The solution is placed in a reactor as in the previous example, agitated continuously and with oxygen bubbled through it for 16 hours at 55° C.

The resulting polymer is washed as in the previous example and treated at 125° C. for 3 hours.

What is claimed is:

1. A process for preparing a cross-linked acrylic polymer from a water-soluble acrylamide monomer, comprising:

preparing an aqueous polymerization solution comprising an acrylamide monomer and a catalyzing agent;

polymerizing the monomer present in the polymerization solution by agitating and heating the polymerization solution;

wherein said polymerization is conducted in the presence of gaseous oxygen to obtain a cross-linked acrylic polymer.

2. The process according to claim 1, wherein the aqueous polymerization solution is saturated with gaseous oxygen.

3. The process according to claim 2, wherein the gaseous oxygen is bubbled through the polymerization solution for a length of time from 1 to 24 hours at a temperature between 30 and 60° C.

4. The process according to claim 1, further comprising:

after said polymerization, washing the cross-linked acrylic polymer in an aqueous medium at a temperature of from 80 to 100° C. for a length of time from 3 to 5 hours.

5. The process according to claim 4, further comprising:
   after the washing holding the cross-linked acrylic polymer at a temperature between 110 and 130° C. for a length of time from 1 to 6 hours.

6. The process according to claim 1, wherein the polymerization of the acrylamide monomer is performed at a temperature between 30 and 80° C.

7. The process according to claim 1, wherein the polymerization of the acrylamide monomer is performed for a length of time from 1 to 24 hours.

8. The process according to claim 1, wherein the aqueous polymerization solution comprises the acrylamide monomer and one or more other monomers selected from the group consisting of N,N'-methylene-bis-acrylamide and N,N'-ethylene-bis-acrylamide.

9. The process according to claim 1, wherein the aqueous polymerization solution further comprises ethylene-bis (oxyethylene nitrilo)-tetracetic acid.

10. The process according to claim 1, wherein the polymerization is performed in the presence of at least one metal salt having at least one metal cation selected from the group consisting of aluminium, zirconium, and titanium.

11. A cross-linked acrylic polymer obtainable obtained by the process according to claim 1.

12. A filling material for cosmetic and/or reconstructive plastic surgery, comprising:
   the cross-linked acrylic polymer according to claim 11.

13. The process according to claim 1, wherein said aqueous polymerization solution further comprises a chelating agent.

14. The process according to claim 1, wherein said cross-linked acrylic polymer is in the form of a hydrogel with imide-amide cross links.

15. The process according to claim 1, wherein said aqueous polymerization solution comprises 2 to 7% by weight of acrylamide, 3 to 5% by weight of N,N'-methylene-bis-acrylamide and 0.1 to 4% by weight of N,N'-ethylene-bis-acrylamide.

16. The process according to claim 1, wherein said catalyzing agent is ammonium persulfate or hydrogen peroxide.

17. The cross-linked acrylic polymer according to claim 11 which is in the form of a hydrogel.

18. The cross-linked acrylic polymer according to claim 11 which is chelated.

19. A process for preparing a cross-linked acrylic polymer from a water-soluble acrylamide monomer, comprising:
   preparing an aqueous polymerization solution comprising an acrylamide monomer and a catalyzing agent;
   polymerizing the monomer present in the polymerization solution by agitating and heating the polymerization solution;
   wherein said polymerization is conducted in the presence of gaseous oxygen to obtain a cross-linked acrylic polymer;
   wherein the aqueous polymerization solution is saturated with gaseous oxygen.

20. A process for preparing a cross-linked acrylic polymer from a water-soluble acrylamide monomer, comprising:
   preparing an aqueous polymerization solution comprising an acrylamide monomer and a catalyzing agent;
   polymerizing the monomer present in the polymerization solution by agitating and heating the polymerization solution;
   wherein said polymerization is conducted in the presence of gaseous oxygen to obtain a cross-linked acrylic polymer;
   wherein the aqueous polymerization solution is saturated with gaseous oxygen;
   wherein said aqueous polymerization solution comprises 2 to 7% by weight of acrylamide, 3 to 5% by weight of N,N'-methylene-bis-acrylamide and 0.1 to 4% by weight of N,N'-ethylene-bis-acrylamide; and
   wherein said cross-linked acrylic polymer is in the form of a hydrogel.

* * * * *

UNITED STATES PATENT AND TRADEMARK OFFICE
CERTIFICATE OF CORRECTION

PATENT NO. : 6,770,711 B2 Page 1 of 1
DATED : August 3, 2004
INVENTOR(S) : Gerardo Balestrieri et al.

It is certified that error appears in the above-identified patent and that said Letters Patent is hereby corrected as shown below:

<u>Column 7,</u>
Line 23, delete "obtainable".

Signed and Sealed this

Twenty-third Day of August, 2005

JON W. DUDAS
*Director of the United States Patent and Trademark Office*